United States Patent [19]

Hessler et al.

[11] Patent Number: 5,199,029
[45] Date of Patent: Mar. 30, 1993

[54] CIRCUIT ARRANGEMENT FOR ESTABLISHING CONFERENCE CONNECTIONS

[75] Inventors: Peter Hessler, Erlangen; Manfred Schmidt, Salz; Bernd Selbach, Eckental, all of Fed. Rep. of Germany

[73] Assignee: U.S. Philips Corporation, New York, N.Y.

[21] Appl. No.: 618,275

[22] Filed: Nov. 26, 1990

[30] Foreign Application Priority Data

Nov. 25, 1989 [DE] Fed. Rep. of Germany ....... 3939044

[51] Int. Cl.⁵ ............................................ H04Q 11/04
[52] U.S. Cl. .................................................... 370/62
[58] Field of Search ................. 370/62, 61, 60.1, 85.5

[56] References Cited

U.S. PATENT DOCUMENTS

| 4,351,049 | 9/1982 | Nobis | 370/62 |
| 4,495,618 | 1/1985 | Dupuis | 370/66 |
| 4,504,942 | 3/1985 | Aro | 370/58.3 |
| 4,550,224 | 10/1985 | Winchell | 370/62 |
| 4,794,591 | 12/1988 | Hoff | 370/62 |
| 4,932,022 | 1/1990 | Keensy | 370/60 |
| 4,937,856 | 6/1990 | Natarajan | 370/62 |
| 5,003,532 | 3/1991 | Ashida | 370/62 |
| 5,072,442 | 12/1991 | Todd | 370/62 |

FOREIGN PATENT DOCUMENTS 3901909 7/1990 Fed. Rep. of Germany .

Primary Examiner—Douglas W. Olms
Assistant Examiner—Temesghen Samuel
Attorney, Agent, or Firm—Anne E. Barschall

[57] ABSTRACT

A circuit arrangement for establishing conference connections comprising conference units is described, which units are linked to form a loop (L). In this loop (L) sum codewords consisting of sample values of the signals of all participants in a conference are transmitted from one conference unit to the next. In each conference unit a sum codeword is updated so that the sample value of a conference signal from the previous loop travel is replaced by the current sample value. In order to enable the monotoring of a travel of sum codewords through the loop with a circuit arrangement of this type and in order to have the sum codewords pass through the loop in a predetermined brief period of time without a necessity for a synchronization of individual processing modules of the conference units, the function of one or more conference units is taken over by a programmed processor (P1 to P4). The exchange of data between the conferees and the processors is controlled by means of an interface circuit (PO). In addition to the sum codewords also test words consisting of transformed sum codewords pass through the loop (L). Sum codewords and test words are buffered in input memories (ES1 to ES4) during their travel through the loop until the associated processor (P1 to P4) has finished the program modules for which the sum codeword or test word respectively is used. These modules are programmed in the individual processors (P1 to P4) in a time offset order.

6 Claims, 1 Drawing Sheet

5,199,029

CIRCUIT ARRANGEMENT FOR ESTABLISHING CONFERENCE CONNECTIONS

BACKGROUND OF THE INVENTION

The invention relates to a circuit arrangement for establishing conference connections comprising conference units linked to form a loop, and wherein:

at least one sum codeword passes from one conference unit of the loop to the next;

a sum codeword is formed from sample values of the signals of all the participants in a conference;

and each conference unit comprises means by which the sum codeword is updated by the use of the actual sample value and by which a conference signal for the allocated conference is formed from the sum codeword.

A circuit arrangement of this type is described in DE 39 01 909 (filing date: Jan. 24, 1989). In this arrangement, however, there are no provisions to verify whether the sum codewords pass through the loop in an error-free manner.

SUMMARY OF THE INVENTION

It is an object of the invention to provide a circuit arrangement of the type mentioned in the opening paragraph in which it is possible to monitor whether sum codewords pass through the loop in a regular fashion and in which the sum codewords pass through the loop in a predetermined period of time without the need for a synchronization of individual operational sequences of the conference units.

This object is achieved in that:

the function of one or more conference units is taken over by a programmed processor;

an interface circuit controls the conference signal input and output by means of write and read commands by which each of the programmed processors is actuated;

one of the processors writes each sum codeword that has been updated into an input memory of the next processor which reads the word from this memory as required;

each updated sum codeword is transformed into a test word and, at a later instant, the contents of the input memory of the next processor are overwritten by the test word whereby the next processor reads the test word from this memory, compares the sum codeword previously contained in this memory to the test word and produces an alarm signal, if necessary;

successive processors perform the program items of updating the sum codeword and comparing the sum codeword to the test word in a time offset order.

The processors used may be free programmable or mask programmable processors.

If the transmission from one processor to the next is effected in series, the input memories ES1 to ES4 of the processors P1 to P4 are arranged as serial-to-parallel converters. Thus, the processors may write the sum codewords or test words already in the form in which the words will be processed by them and, consequently, calculating time will be saved. As a result, all processors are to be provided with parallel-to-serial converters AS1 to AS4 as output memories.

A processor already containing these two memories as integrated components is the DSP 56001.

BRIEF DESCRIPTION OF THE DRAWINGS

By means of the drawing Figures and an exemplary embodiment, the invention will be further explained in which.

DESCRIPTION OF THE PREFERRED EMBODIMENT

Figure 1:
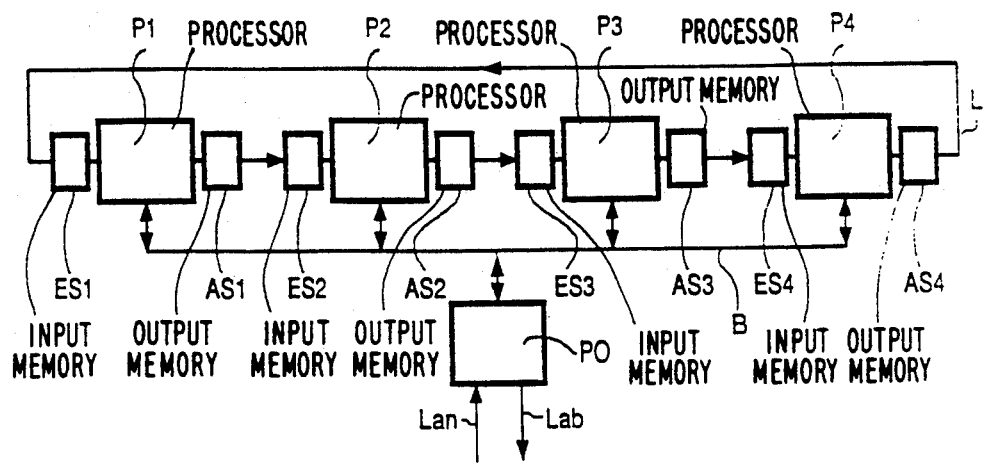
FIG. 1 shows a basic diagram of an arrangement according to the invention.

FIG. 1 shows a loop L in which four programmable processors P1, P2, P3 and P4 are arranged having each a dedicated serial-to-parallel converter as an input memory ES1, ES2, ES3 and ES4 and a dedicated parallel-to-serial converter as an output memory AS1, AS2, AS3 and AS4. The processors P1 to P4 in question are free programmable processors of the type DSP 56001 which comprise the memories ES1 to ES4 and AS1 to AS4 as integrated components; each of them processing exactly two conference signals.

Over a bus system B the processors P1 and P4 are connected to an interface circuit—in this case an interface processor P0—which receives the conference signals over a line Lan as multiplex signals and again transmits the conference signals as multiplex signals to the individual conferees over a line Lab. The interface processor P0 acts, for example, as a demultiplexer distributing the data of the conferees over the bus B to the individual processors P1, P2, P3 and P4 so that all processors receive the conference bits simultaneously.

In the present example the signals of the individual participants are encoded into the DCDM code and have a 32 kbit/s bit rate. For enabling a summing operation in the sense of a linear superposition of the conference signals, the individual processors first transcode the conference signals into (linearly quantized) PCM signals. The codewords—in this case a 1-bit codeword is concerned—of all eight conference signals simultaneously arrive at the inputs of the processors P1, P2, P3 and P4. The arrival of every fourth conference bit at the same time synchronizes in all processors the performance of a sequence of sub-tasks. Individual operational sequences of the processors are not in synchronism. The common starting points of the processors will be referenced synchronization instants in the following.

For example, processor P1 essentially is to carry out the following coarsely structured sub-tasks within a sampling interval of the PCM codewords (125 μs):

transcoding the received conference bits (32 kbit/s) and the preceding section of the conference signal into linearly quantized PCM codewords at an 8 kHz sample rate, reading from the input memory ES1 a sum codeword which consists of the sum of all updated PCM codewords (sample value) of the signals of all conferees, processing this sum codeword with the PCM codeword into a new sum codeword as well as transmitting the new sum codeword to the input memory ES2, generating a conference signal for the connected conferees in the DCDM code (32 kbit/s) and transmitting same to the interface processor P0, reading a test word from the input memory ES1, comparing the test word (in the present example an inverted sum codeword) to the associated sum codeword, forming a new test word and transmitting same, and generating alarm signals, if necessary.

During the aforementioned 125 μs—the time mentioned in the problem setting—all sum codewords are also to have finished a complete processing loop. In order to enable the words to finish a complete processing loop, according to the invention in each processor the time between writing a sum codeword into an input memory and reading, processing and writing the new sum codeword into an input memory of the next processor—to be termed loop time in the following—amounts to a quarter of 125 μs.

The loop time consists of the time for transmitting a signal from one processor to the next and of the dwell time in the processor. Because of the long transmit time (serial transmission) the dwell time is to be kept as short as possible so that the sum provides the necessary loop time. The shortest possible loop time may be achieved by changing the order in time of the program modules, with an even more refined subdivision of the sub-tasks.

Consequently, in each processor a rearrangement of the program modules (without modifying their contents) is effected so that a processor does not read the sum codeword from its input memory until the instant at which the previous processor has duly terminated the calculation of this sum codeword and has already written this word into the input memory. Worded differently, the sub-task which provides the processing of the sum codeword is started at each processor at a later instant.

Figure 2:
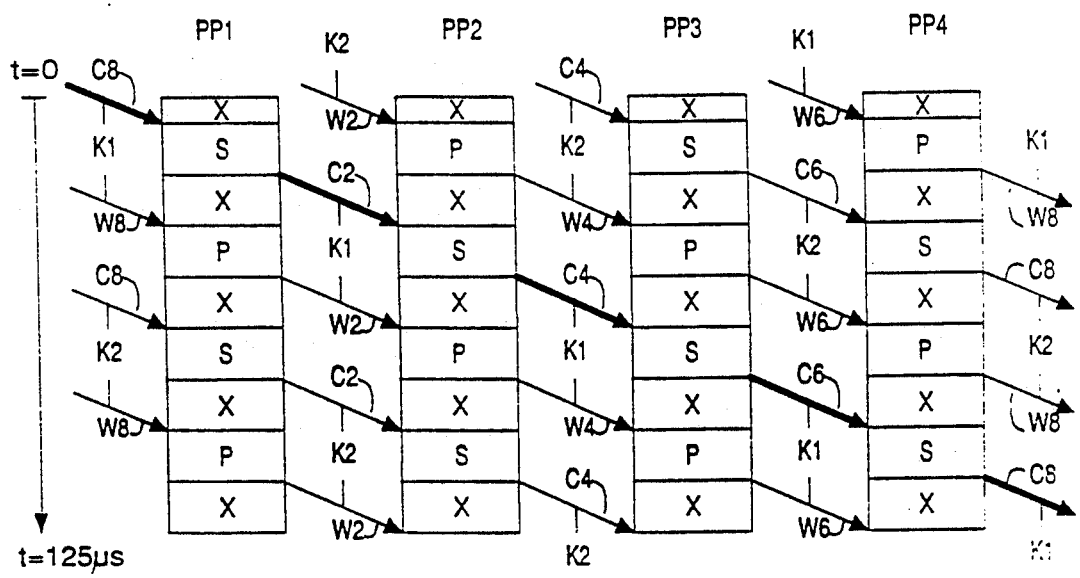
FIG. 2 shows a diagram for programming the processors in an arrangement according to the invention.

FIG. 2 symbolically shows the programs PP1 to PP4 of the processors P1 to P4. Each processor starts completing its program from top to bottom at the synchronization instant (t=0) common to all processors as shown by the time axis in the left top corner of FIG. 2. Two sum codewords which travel through the loop of processors and are updated in each of the processors i.e. the sample values of the previous travel are replaced by the current sample values of the two conference signals applied to a processor. Each sum codeword corresponds to a conference at which each conferee out of the total of eight conferees may be a participant in neither one or both conferences.

The program modules which process a sum codeword are referenced S in FIG. 2 and the modules making a comparison between a sum codeword and the associated test word—for example an inverted codeword—are referenced P. All further program modules are referenced by an X.

After a program module X in program PP1 of processor P1 has been terminated, this processor starts with the program module S and for this purpose writes a sum codeword C8 of the first conference K1 from its input memory ES1 into its working memory. This operation is denoted by means of the first bold-type arrow in the left top corner of FIG. 2. The number following the letter C of the sum codeword denotes the conference participant whose signal was the last to update the sum codeword. The sum codeword C8 updated by the top program module S of the program PP1 is therefore written into the input memory ES2 of the processor P2 as a sum codeword C2, because the processor P1 was the last to update the sum codeword of the conference K1 by means of the signal of the second conference participant. The processors—as discussed hereinbefore—process the data of two participants.

The processor P2 in its turn reads the sum codeword C2 at the beginning of its program module S from its input memory ES2 and forms it into the sum codeword C4 and so on.

The length of the program module X of the program PP2 from the synchronisation instant to the entry of the sum codeword C2 of the first conference K1 is determined such that the processor P1 has definitely generated and transferred the codeword C2 provided that the operation is performed error-free. The same holds for the pairs of the processors P2, P3 and P4.

The order of all bold-type arrows from left top corner to right bottom corner in FIG. 2 depicts a graphical representation of a travel of the sum codeword of the first conference K1 through loop L. The sum codeword remains stored in memory ES1 until it is read out from there after the program PP1 is re-started.

After a time not further representable in this context, the test word W8 as shown by the second arrow in the left top corner of the program PP1 follows the sum codeword C8 of the conference K1. Once it has been written into the processor P1, it is compared by the program module P to the codeword C8 stored in an internal memory of the processor, that is to say, the test word W8 is inverted and its identity is verified by means of sum codeword C8. If there is no match, the processor P1 transmits an alarm signal to the processor P0. In the program module P of processor P1 the codeword C2 of conference K1 will then be inverted bit-by-bit and written into the memory ES2 of the processor P2 as a test word W2. At this stage the same operation as in processor P1 is performed but in a time-delayed manner. Also with the sum codewords and test words of conference K2 all calculation steps are performed in analogy with those of conference K1.

FIG. 2 shows that for the described transmission of the sum codewords and test words no more than two different program variants are necessary. When this is effected, successive processors in the loop of processors are to be loaded each with different variants of this program.

By means of the arrangement according to the invention the following error functions may be detected:

bit errors in a sum codeword, partial or complete loss of a sum codeword, failure of a processor.

We claim:

1. Circuit arrangement for establishing conference connections among a plurality of participant conference units linked to form a loop, comprising;

means responsive to sample values of signals of all the participant conference units in a conference for forming a sum codeword;

means for passing the sum codeword from one conference unit of the loop to the next;

updating means in each participant conference unit for updating the sum codeword by the use of the actual sample value and forming a conference signal from the sum codeword;

a programmed processor for taking over the function of one or more participant conference units;

interface circuit means coupled to the programmed processor for generating write and read commands by which the programmed processor is actuated for controlling the conference signal input and output;

means in each processor for writing each updated sum codeword into an input memory of the next processor;

means for transforming each updated sum codeword into a test word and overwriting the contents of the input memory of the next processor with the test word at a later instant, means in the next processor in the loop for reading the test word from this memory, comparing the sum codeword previously contained in this memory to the testword and produces an alarm signal depending upon the result of the comparison;

sequencing means for causing successive processors to perform the program items of updating the sum codeword and comparing the sum codeword to the test word in a time offset order.

2. Circuit arrangement as claimed in claim 1, in which the input memories comprise serial-to-parallel converters and the output memories comprise parallel-to-serial converters (AS1 to AS4).

3. Circuit arrangement as claimed in claim 2, in which the processors, the input, and the output converters comprise integrated components.

4. Circuit arrangement as claimed in claim 1, characterised in that sum codewords inverted bit-by-bit are used as test words.

5. The circuit of claim 2, wherein sum codewords inverted bit-by-bit are used as test words.

6. The circuit of claim 3, wherein sum codewords inverted bit-by-bit are used as test words.

* * * * *